United States Patent [19]
Greer

[11] Patent Number: 5,950,807
[45] Date of Patent: *Sep. 14, 1999

[54] WIRE BELT WITH VARIABLE SPACING AND METHOD OF MAKING

[75] Inventor: David L. Greer, Londonderry, N.H.

[73] Assignee: Wire Belt Company of America, Londonderry, N.H.

[*] Notice: This patent issued on a continued prosecution application filed under 37 CFR 1.53(d), and is subject to the twenty year patent term provisions of 35 U.S.C. 154(a)(2).

[21] Appl. No.: 08/803,390

[22] Filed: Feb. 20, 1997

[51] Int. Cl.$^6$ .................................................. B65G 17/06
[52] U.S. Cl. ............................................ 198/850; 198/848
[58] Field of Search ................................... 198/848, 850, 198/844.2

[56] References Cited

U.S. PATENT DOCUMENTS

| | | | |
|---|---|---|---|
| D. 319,328 | 8/1991 | Faulkner | D34/29 |
| 507,865 | 10/1893 | White . | |
| 1,009,670 | 11/1911 | Kihlgren et al. . | |
| 1,895,345 | 1/1933 | Pink . | |
| 2,776,045 | 1/1957 | Heinrichs | 198/848 |
| 2,826,383 | 3/1958 | Spencer | 245/10 |
| 2,862,602 | 12/1958 | Greer et al. | 198/182 |
| 3,794,155 | 2/1974 | Bechtel, Jr. | 198/194 |
| 4,036,352 | 7/1977 | White | 198/778 |
| 4,262,392 | 4/1981 | White | 24/36 |
| 4,410,083 | 10/1983 | Poerink | 198/853 |
| 4,754,871 | 7/1988 | Gustafson | 198/848 |
| 4,846,339 | 7/1989 | Roinestad | 198/852 |
| 4,937,921 | 7/1990 | Musil | 24/33 |
| 4,944,716 | 7/1990 | Graff | 474/255 |
| 4,996,750 | 3/1991 | Musil | 24/33 |
| 5,065,860 | 11/1991 | Faulkner | 198/848 |
| 5,069,331 | 12/1991 | Bartkowiak | 198/848 |
| 5,123,523 | 6/1992 | Langlois et al. | 198/844.1 |
| 5,158,171 | 10/1992 | Graff | 198/848 |
| 5,176,249 | 1/1993 | Esterson et al. | 198/850 |
| 5,190,143 | 3/1993 | Froderberg et al. | 198/778 |
| 5,217,577 | 6/1993 | Steiner | 162/232 |
| 5,334,440 | 8/1994 | Halterbeck et al. | 428/222 |
| 5,375,695 | 12/1994 | Daringer et al. | 198/778 |
| 5,404,998 | 4/1995 | Frye | 198/848 |
| 5,501,319 | 3/1996 | Larson et al. | 198/778 |

OTHER PUBLICATIONS

Martens HL Conveyor Belt Catalog.
Martens: Transportbander—Conveyor Belts, 1994.
Martens: HL Conveyor Belt Leaflet, Jan., 1998.

*Primary Examiner*—Kenneth Noland
*Assistant Examiner*—Khoi H. Tran
*Attorney, Agent, or Firm*—Bourque and Associates, PA

[57] ABSTRACT

A wire belt having increased belt strength includes a plurality of wire links having alternating wide linking portions and narrow linking portions interlocked with respective linking portions of an adjacent wire link. The assembly of the wire belt includes interlocking the wire links, for example, by placing the wide linking portions into an engagement with wide linking portions of an adjacent wire link. The width of the wide linking portions is about equal to the minimum width that will allow the wire link to be interlocked with an adjacent wire link without bending the wire link in excess of the yield strength of the wire link. The width of the narrow linking portions is less than the width of the wide linking portions, and preferably, dimensioned to receive a sprocket for driving the wire belt. The wire links preferably have an undulating shape and include first and second end loops that interlock with adjacent wire links. The wire belt further includes one or more splice connectors that interlock with the narrow linking portions and/or a wide linking portions in adjacent wire links to splice the wire links together to form a wire belt.

20 Claims, 5 Drawing Sheets

WIRE BELT WITH VARIABLE SPACING AND METHOD OF MAKING

FIELD OF THE INVENTION

The present invention relates to wire belts and in particular, to a wire belt having wire links forming a variable spaced mesh.

BACKGROUND OF THE INVENTION

Wire belts are commonly used for conveying articles during cooling, drying, coating, cooking and many other applications. In one particular application, wire belts are used to convey food articles during cooking or processing of the food. Wire belts are advantageous for food processing because they provide an open, flow-through mesh, a high degree of flexibility, a sanitary construction, simple installation and maintenance, and the ability to be positively driven. As the demands of production increase, however, the number of articles conveyed must be increased and the wire belt must support heavier loads and be driven faster, resulting in an increased strain on the wire belts. Existing wire belts have been unable to handle the increased production requirements.

Figure 1:
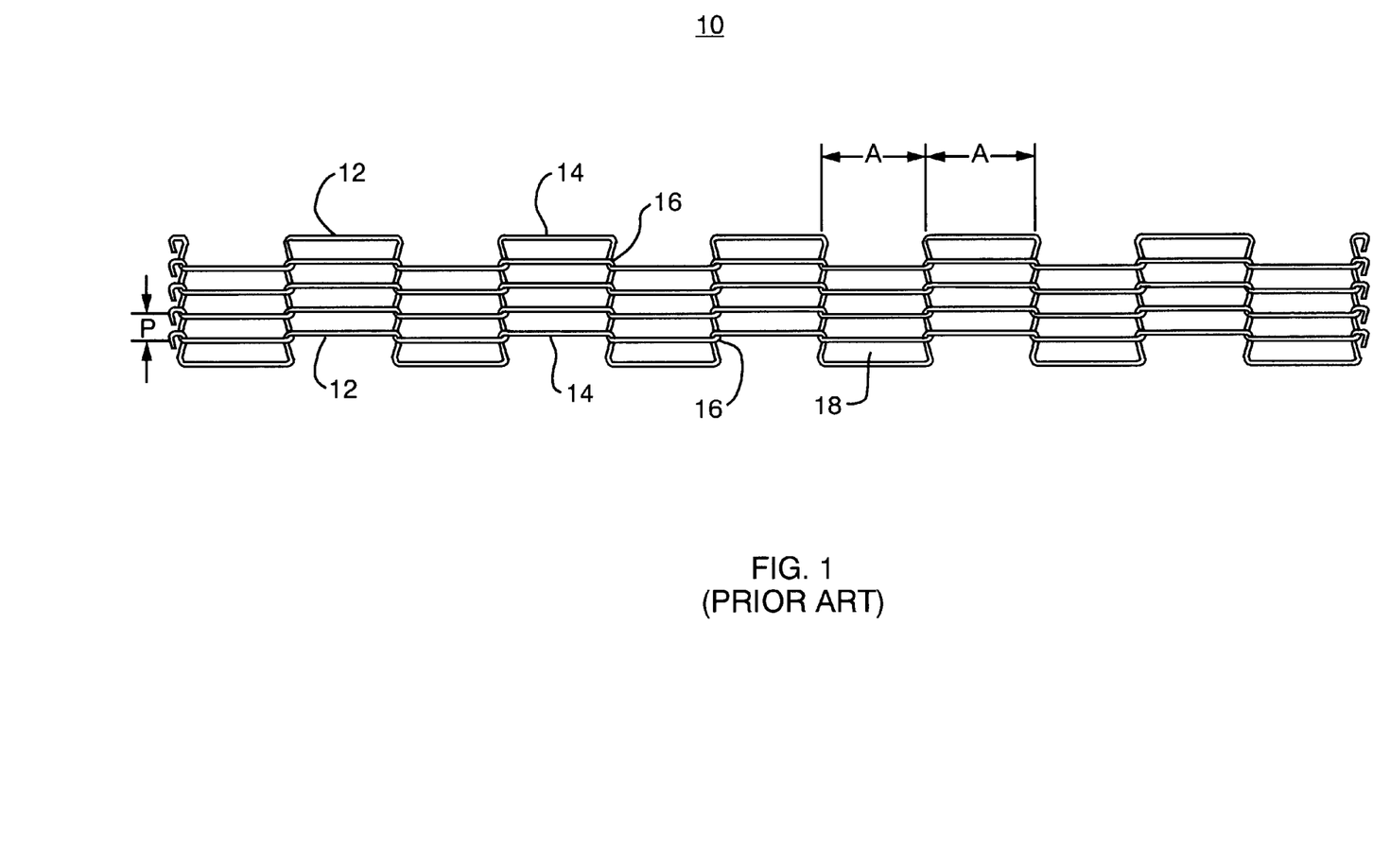
FIG. 1 is a top schematic view of a prior art wire belt.

Existing wire belts 10, FIG. 1, are typically made of interlocking wire links 12 that form the open mesh and provide a flexible belt that is suited to the above applications. The wire links 12 of existing wire belts 10 include linking portions 14 that are interlocked or linked with linking portions 14 of an adjacent wire link 12. The interlocked linking portions 14 form a number of joints 16 and open spaces 18 in the wire belt 10. The open spaces 18 are defined by the distance between the wire links 12, known as the "pitch" (P), and the "spacing width" (A) of the locking portions 14. The "mesh" of a wire belt 10 is defined as the combination of the pitch P and wire diameter.

The belt strength of wire belts is primarily determined by the sum of the cross-sectional area of the wires doing the pulling, i.e. the number of joints 16. Possible ways of increasing the strength of existing wire belts include using a larger diameter wire, using a stronger wire (e.g., higher tensile strength or stronger materials) and/or increasing the number of joints 16 that do the pulling. Because of the limitations on the "spacing width" (A) and "mesh" (pitch (P) and wire diameter) in existing wire belts, these approaches to increasing belt strength are not practical.

To form a wire belt 10 the wire links 12 must be interlocked, e.g., by weaving each wire link 12 with an adjacent wire link 12 into the wire belt 10. Increasing the diameter of the wire links 12 decreases the flexibility of the wire links 12 and makes interlocking of the wires difficult, resulting in an inflexible and/or distorted wire belt. Increasing the strength of the wire material may increase the "brittleness" of wire links 12 making them susceptible to cracking when the wire link 12 is formed.

Increasing the number of joints in a wire belt 10 of a given width requires decreasing the "spacing width" (A) of the linking portions 14. For a given mesh, decreasing the "spacing width" (A) is not possible beyond a minimum width which allows the wire links 12 to be interlocked without causing the wire to bend in a radius surpassing the yield strength of the wire. Merely decreasing the "spacing width" (A) of linking portions 14 to increase the number of joints would therefore cause permanent deformation in the wire links and a distorted wire belt.

Accordingly, what is needed is a wire belt having an increased belt strength to provide added product support and prevents articles from falling through the mesh of the wire belt. What is also needed is a method for increasing the strength of the wire belt by increasing the number of joints without having to increase the diameter or material of the wire link and without resulting in deformed wire links and a distorted and inflexible wire belt.

SUMMARY OF THE INVENTION

The present invention features a wire belt and a method for forming the wire belt with an increased belt strength. The wire belt includes a plurality of wire links each of which is linked with at least one adjacent wire link in the wire belt. Each wire link includes a first end and a second end and a plurality of linking portions between the first end and the second end. The plurality of linking portions are linked with respective linking portions in an adjacent wire link forming a plurality of joints in the wire belt.

At least a portion of the plurality of linking portions include alternating narrow linking portions and wide linking portions. The wide linking portions have a width greater than the width of the narrow linking portions. The narrow linking portions and wide linking portions are linked with respective narrow linking portions and wide linking portions in the adjacent wire link forming narrow spaces and wide spaces. Alternating the wide linking portions and narrow linking portions allows the belt strength to be increased by increasing the number of joints while maintaining the flexibility and shape of the wire belt.

In one embodiment, the narrow linking portions and wide linking portions alternate from proximate the first end to proximate the second end of the plurality of wire links, forming narrow joints and wide joints alternating from proximate the first edge to proximate a second edge of the wire belt. One example of the linking portions has an undulating shape, such as a substantially square wave.

Each wire link preferably includes an odd number of linking portions where the number of wide linking portions equals the number of narrow linking portions minus one. The width of the wide linking portions is preferably approximately equal to a minimum width calculated based on a diameter of the wire link and a pitch of the linking portions to allow the wide linking portions to be placed into interlocking engagement with the respective wide linking portions of the adjacent wire link. The width of the narrow linking portions is preferably dimensioned to receive a sprocket, for driving the wire belt.

Each of the plurality of wire links preferably includes a first loop and a second loop at respective first and second ends of the wire links. The first loop and the second loop are linked with the adjacent wire link in the wire belt.

According to one embodiment, the wire belt further includes at least one splice connector linked between two of the wire links. One example of the splice connector includes at least one splice connector portion linked between respective narrow or wide linking portions of two of the plurality of wire links.

The method of forming the wire belt includes forming a plurality of alternating wide linking portions and narrow linking portions along at least a portion of each of the wire links, and linking the alternating wide linking portions and narrow linking portions with respective alternating wide linking portions and narrow linking portions in an adjacent wire link. The preferred method further includes selecting a belt width (X), an end portion width (D) of end portions of each wire link, a width (C) of the narrow linking portions, a diameter of the wire links, and a pitch of the wire links;

determining a minimum width (MW) of the wide linking portions based upon the diameter of the wire links and the pitch of the wire belt; and determining a number of narrow linking portions. The number of narrow linking portions (CS) is determined according to the following equation:

$$CS=(X-2D+MW)/(MW+C).$$

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 2:
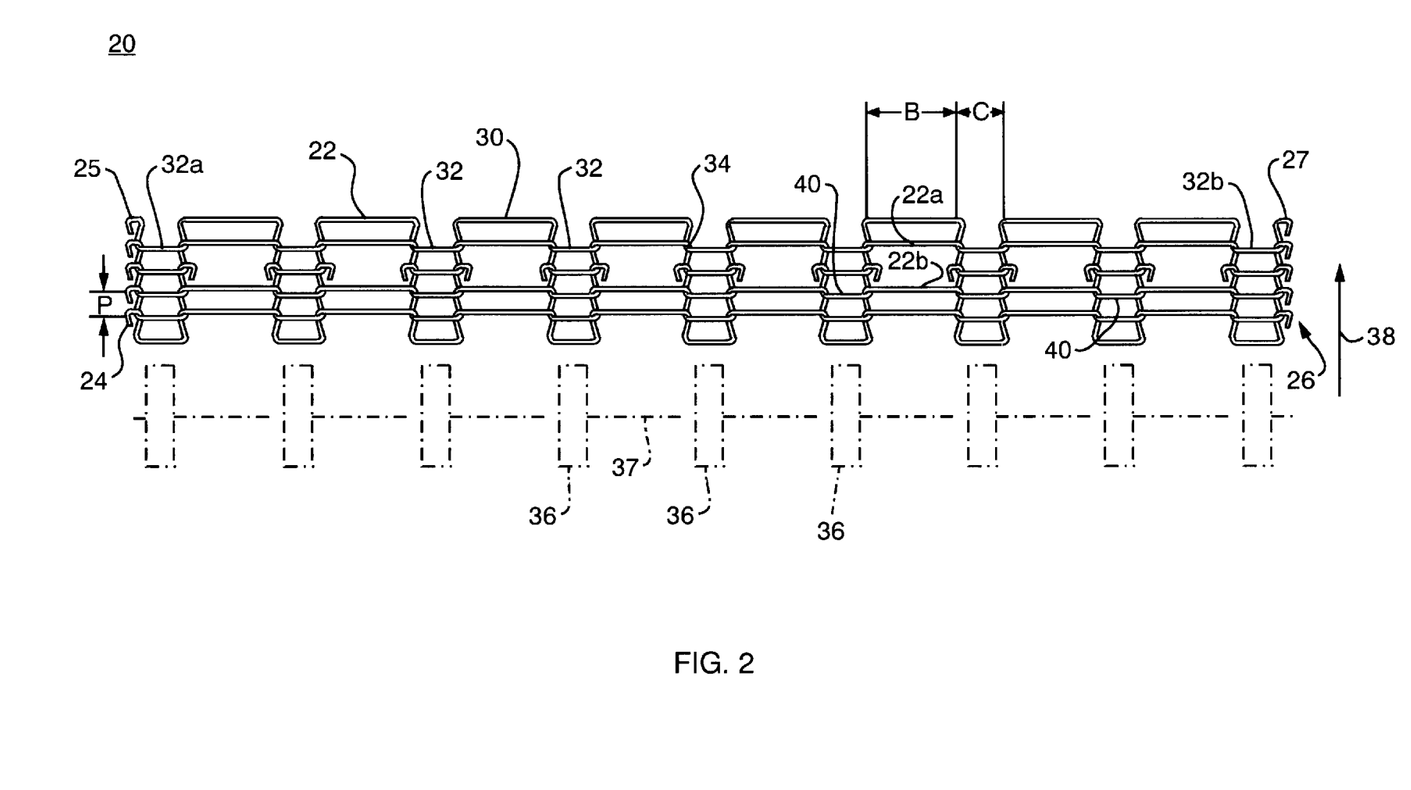
FIG. 2 is a top schematic view of a wire belt having variable spacing according to the present invention.

A wire belt 20, FIG. 2, according to the present invention, includes a plurality of wire links 22, each of which is linked with at least one adjacent wire link 22 to form the wire belt 20. According to one example, a plurality of wire links 22 are interlocked or linked to form an endless conveyor belt. The wire belt 20 is flexible, has an open mesh, and is used to convey articles, such as food, during cooling, drying, coating, cooking and other applications.

Each wire link 22 preferably has an undulating shape, such as a modified square sine wave shape and can be made of stainless steel or any other suitable metal or non-metal material. Each wire link 22 includes first and second ends 24, 26 forming edges of the wire belt 20. The first and second ends 24, 26 of each wire link 22 preferably include first and second loops 25, 27 that interlock with an adjacent wire link 22 in the wire belt 20. In one example, the first and second loops 25, 27 can form closed edges that prevent snagging and damage to the wire belt 20, for example, as disclosed in U.S. Pat. No. 5,404,998 incorporated herein by reference.

Each of the wire links 22 include alternating wide linking portions 30 and narrow linking portions 32 forming the undulations. The alternating wide linking portions 30 and narrow linking portions 32 are linked with respective wide linking portions 30 and narrow linking portions 32 of adjacent wire links 22, forming a plurality of joints 34 and defining the open mesh of the wire belt 20. The wide linking portions 30 have a width (B) that is greater than the width (C) of the narrow linking portions 32. By providing alternating wide linking portions 30 and narrow linking portions 32, the number of joints 34 across the width of the wire belt 20 is increased as compared to existing wire belt 10 having linking portions 14 of the same width (A) (see FIG. 1), thereby increasing the belt strength without having to change the diameter or the material of the wire links 22.

The width (B) of the wide linking portions 30 is preferably about equal to a minimum width that allows the wire links 22 to be interlocked by weaving. This minimum width (MW) is determined based upon the diameter of the wire links 22 and the pitch (P) or spacing between the wire links 22, as will be described in greater detail below. The width of the narrow linking portions 32 can be less than the minimum width (MW) without affecting the ability of the wire links 22 to be interlocked or woven with adjacent wire links 22.

The width (C) of the narrow linking portions 32 is preferably a predetermined width which is selected to receive a sprocket 36 for driving the wire belt 20. One or more sprockets 36 disposed about shaft 37 engage the narrow linking portions 32 of the wire belt 20 for driving the wire belt 20 in a direction shown generally by arrow 38. The increased strength of the narrow linking portions 32 allow the wire belt 20 to be driven with sprockets 36 with much less bending moment, leading to less severe cyclic loading due to the wire flexation.

Figure 2A:
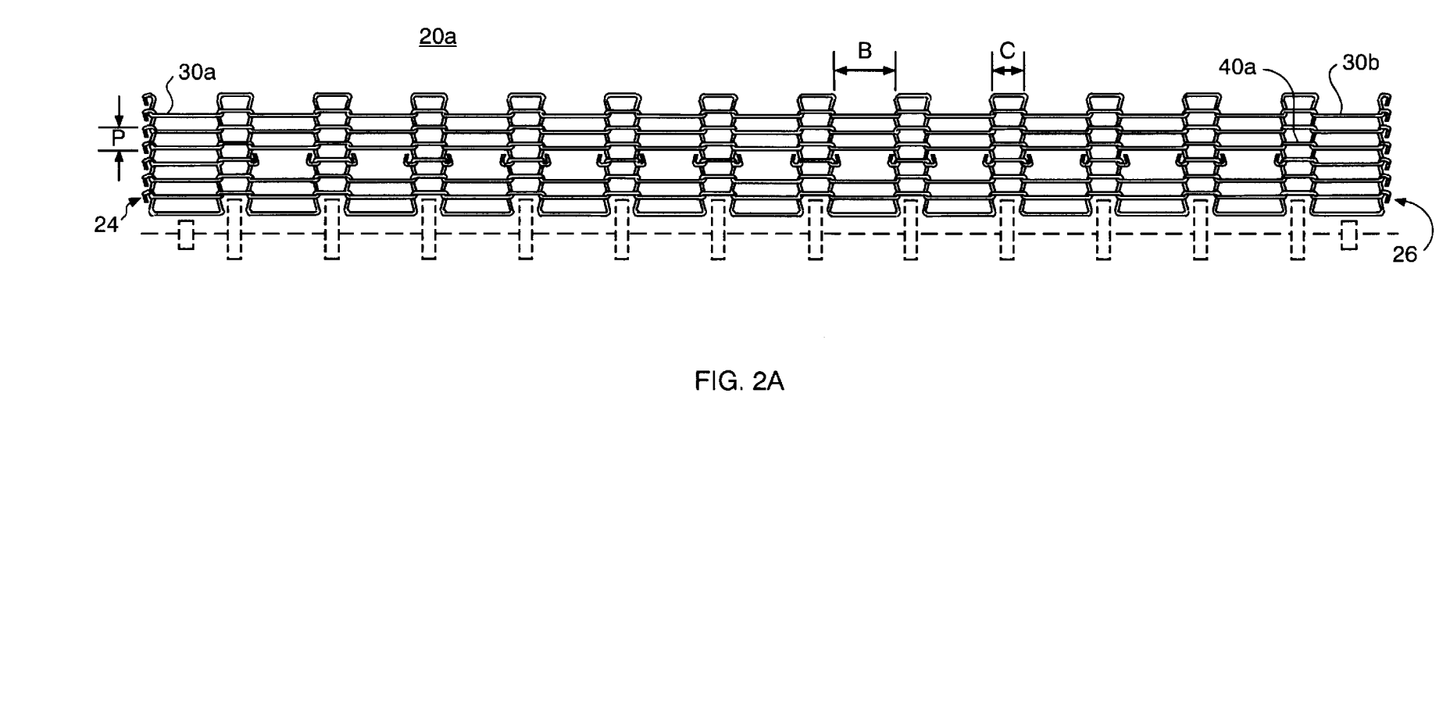
FIG. 2A is a top schematic view of the wire belt according to an alternative embodiment.

The wire belt 20 preferably includes narrow linking portions 32a, 32b proximate the first and second ends 24, 26 of the wire links 22, to drive the wire belt 20 with sprockets 26 close to the first and second ends 24, 26 of the wire links 22, thereby maximizing the number of joints across the width. Alternatively, the present invention contemplates a wire belt 20a (FIG. 2A) having wide linking portions 30a, 30b proximate first and second ends 24, 26.

The exemplary embodiment shows each wide linking portion 30 having substantially the same width (B) and each narrow linking portion 32 having substantially the same spacing width (C). The present invention, however, contemplates wide linking portions 30 of varying widths and narrow linking portions 32 of varying widths.

The preferred embodiment includes wide linking portions 30 and narrow linking portions 32 that alternate along the entire width of each wire link 22 from the first end 24 to the second end 26, forming an odd number of linking portions: with the number of wide linking portions 30 being equal to the number of narrow linking portions 32 minus one. The present invention, however, contemplates alternating wide linking portions 30 and narrow linking portions 32 along only a portion of each wire link 22 with the remaining linking portions being of the same width.

The wire belt 20 having wire links 22 with alternating wide linking portions 30 and narrow linking portions 32 is capable of being spliced, for example, to form an endless wire belt conveyor. One embodiment of the wire belt 20 further includes one or more splice connectors 40 linked between two of the wire links 22a, 22b in the wire belt 20, for splicing the wire belt 20.

One type of splice connector 40 includes at least one splice connector portion that links or interlocks with narrow linking portions 32 in the adjacent wire links 22a, 22b. The present invention also contemplates splice connectors 40 that interlock with wide linking portions 30 or a splice connector 40a (FIG. 2A) that interlocks with both wide linking portions 30 and narrow linking portions 32.

Figure 3:
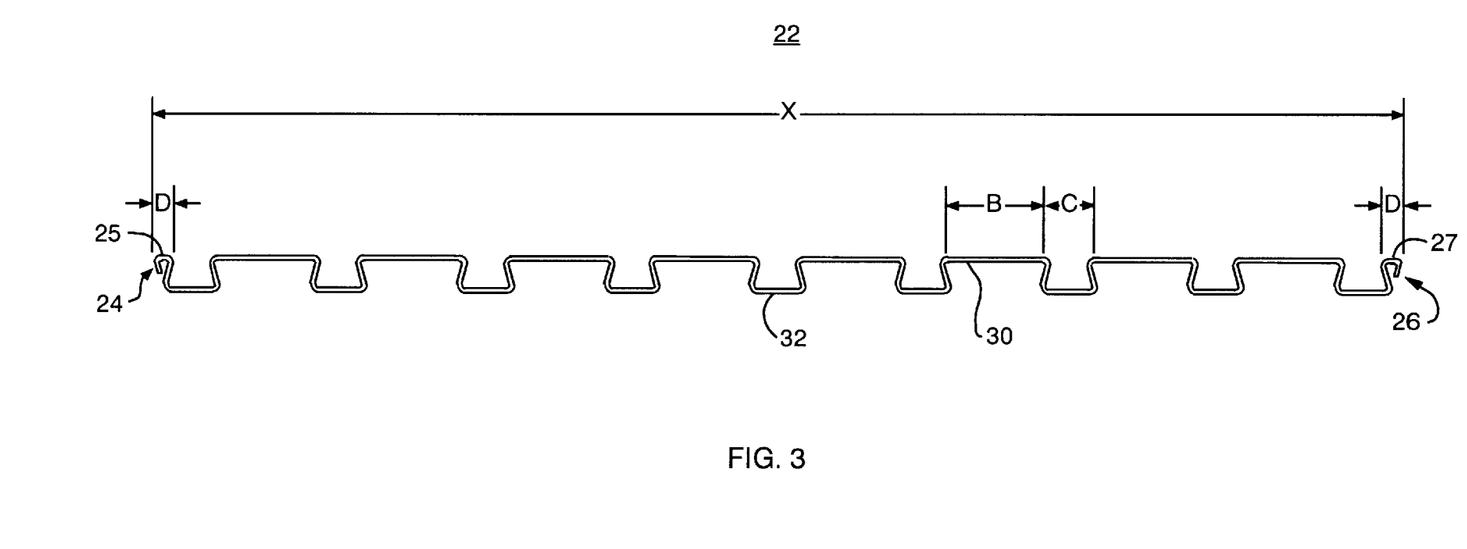
FIG. 3 is a top schematic view of a wire link used in a wire belt according to the present invention.

To construct the wire belt, the dimensions of each wire link 22, FIG. 3, and the number of widely-spacing linking portions 30 and narrow linking portions 32 are determined. Each wide linking portion 30 has a width (B), each narrow linking portion 32 has a width (C), and each end loop 25, 27 has a dimension (D).

First, the overall belt width (X) and the mesh of the belt is selected. The width (X) of the belt depends upon the desired application, for example, the number and weight of the items that are to be conveyed and the space limitations. The mesh is a combination of pitch (P), i.e. the distance between adjacent wire links 22 (see FIG. 2) and the diameter of each wire link 22. Various mesh sizes are available also depending upon the particular application, for example, the size of items and weight of the load.

The dimensions (D) of the end loops 25, 27 and the minimum width (MW) are determined based upon the selected mesh size. For a given mesh size (i.e. wire diameter and pitch), the minimum width (MW) is the minimum width that will allow the wide linking portion 32 to be woven, as described below, with an adjacent wire link without causing the wire link to bend beyond its yield strength. To allow the wire link to be bent and woven without being deformed, an increase in wire diameter requires an increase in the minimum width and an increase in the pitch allows a decrease in the minimum width. The minimum width (MW) can be determined for the selected mesh size using mathematical and manufacturing techniques known to those of ordinary skill in the wire belt art.

The width (C) of the narrow linking portions 32 is determined based upon the width of the drive sprockets used to drive the wire belt. In one example, the width (C) of the narrow linking portion 32 is approximately ⅞ inches which accommodates sprockets of both 9/16 inches and ⅝ inches in width, leaving the appropriate gap recommended between the joint 34, and the edge of the sprocket 36 without interference (FIG. 2).

Once the minimum width (MW), the end loop dimensions (D) and the width (C) of the narrow linking portions 32 have been selected, the number of wide linking portions 30 and narrow linking portions 32 is determined. The number of narrow linking portions 32 (CS) is determined according to the following equation, rounded down to the nearest whole number:

$$CS = (X - 2D + MW)/(MW + C) \qquad \text{Eq. (1)}$$

$CS$ = number of narrow portions;

$X$ = a width of the wire belt;

$D$ = a width of an end portion of each of the wire links;

$MW$ = the minimum width; and $C$ = a predetermined width of the narrow linking portions.

The number of wide linking portions 30 (WS) is equal to the number of narrow linking portions 32 (CS) minus one:

$$WS = CS - 1 \qquad \text{Eq. (2)}$$

The width (B) of the wide linking portions 30 is preferably calculated according to the following equation:

$$B = ((X-2D)-(C \times CS))/(CS-1) \qquad \text{Eq. (3)}$$

The wire link 22 is then formed according to the calculated dimensions. One example of a wire link 22 formed according to the above method includes a length (X) of about 32 in., a mesh of ½ ×0.072 (i.e. pitch P=½ in. and wire diameter=0.072 in.), a minimum width (MW) of about 1.75 in., a width (C) of about 0.875., and an end loop width (D) of about 9/32 in. The number of narrow linking portions 32 equals:

$$CS = (32 - 2(9/32) + 1.75)/(1.75 + 0.875) = 12.64 \approx 12.$$

The width (B) of the wide linking portions 30 is equal to:

$$B = ((32 - 2(9/32)) - 0.875(12))/(12-1) = 1.903 \text{ in.}$$

The width (B) is thus about equal to the minimum width (MW) for the selected mesh size.

In the wire belt made according to this method, the number of wide linking portions 30 is equal to 11 and the total of the linking portions 30,32 is twenty-three (23) forming twenty-four (24) joints. A prior art wire belt 10 (See FIG. 1) of the same mesh size and width would have only seventeen (17) total linking portions and eighteen (18) joints. The number of joints and therefore the strength of the belt is significantly increased without affecting the mesh size, the overall belt width, or the ability to assemble the wire links by weaving.

Figure 4:
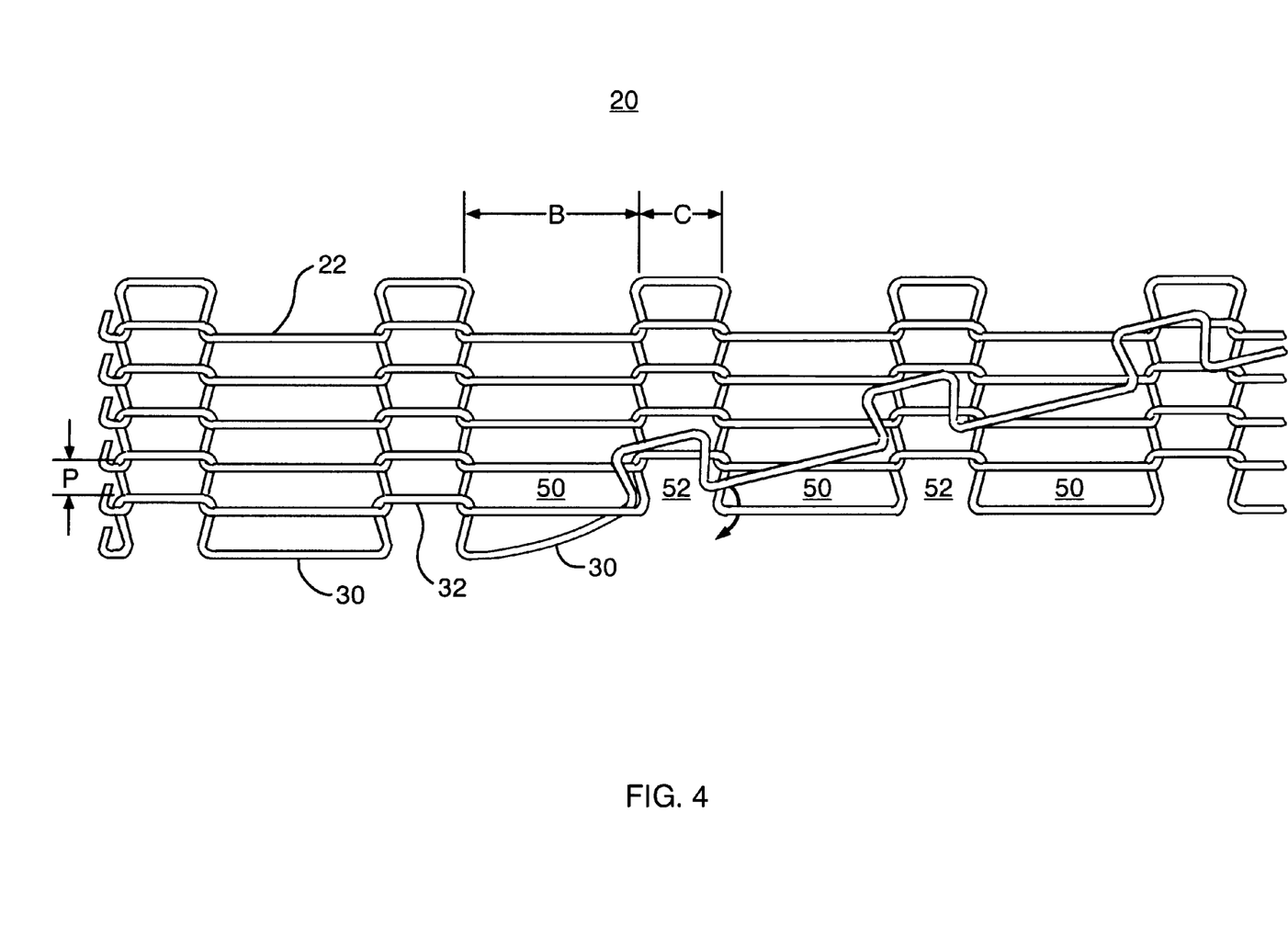
FIG. 4 is a top schematic view of a wire belt being woven according to one embodiment of the present invention.

To assemble the wire belt 20, FIG. 4, according to the present invention each wire link 22 is woven with an adjacent wire link 22 in the belt 20. When interlocked, the wide linking portions 30 form closed spaces 50 between adjacent wire links 22 defined by the width (B) and the pitch (P). The narrow linking portions 32 form open spaces 52 between adjacent wire links 22 defined by the width (C) and the pitch (P).

Interlocking or weaving the wide linking portions 30 requires bending the wide linking portion 30 to be received into the closed spaces 50. Since the width (B) of the wide linking portions 30 is about equal to the minimum spacing width for the particular mesh size, the wide linking portions 30 are capable of being bent and woven into interlocking engagement without surpassing the yield strength of the wire link 22 and deforming the wire link.

The open spaces 52 defined by the narrow linking portions 32 do not require significant bending force to interlock the narrow linking portions 32 defining open spaces 52 in the wire belt 20. The width (C) of the narrow linking portions 32 can therefore be significantly less than the minimum width required for the wide linking portions 30 of the given mesh size.

Accordingly, by alternating wide linking portions and narrow linking portions along a wire link, a wire belt can be formed with an increased strength without deforming the wire links in the wire belt and causing a distorted or inflexible belt. The wire belt having alternating wide linking portions increases the number of interlocking joints in the wire belt without having to change the diameter or material of the wire links or otherwise affect the assembly or flexibility of the wire belt. The wire belt of the present invention also prevents strain and damage to the wire belt since the wire belt is driven with sprockets engaging the stronger narrow linking portions. The increased number of joints in the wire belt also provides for additional product support by preventing the product from falling through the mesh.

Modifications and substitutions by one of ordinary skill in the art are considered to be within the scope of the present invention which is not to be limited except by the claims which follow.

What is claimed is:

1. A wire belt comprising:
   a plurality of wire links, each of said plurality of wire links being linked with at least one adjacent wire link in said wire belt, each of said plurality of wire links comprising:
      a first end and a second end; and
      a plurality of linking portions between said first end and said second end, said plurality of linking portions being linked with respective linking portions in said at least one adjacent wire link forming a plurality of joints in said wire belt, said plurality, of linking portions including alternating wide linking portions and narrow linking portions, wherein said narrow linking portions and wide linking portions alternate from proximate said first end to proximate said second end of each said plurality of wire links, wherein first and second narrow linking portions are located proximate said first end and said second end respectively of said plurality of wire links, said wide linking portions having a width greater than a width of said narrow linking portions, said narrow linking portions and said wide linking portions being interlocked with respective narrow linking portions and wide linking portions in said at least one adjacent wire link.

2. The wire belt of claim 1 wherein said plurality of linking portions have an undulating shape.

3. The wire belt of claim 2 wherein said undulating shape of said plurality of linking portions is a substantially square wave.

4. The wire belt of claim 1 wherein each of said plurality of wire links further comprises an odd number of said plurality of linking portions, and wherein a number of said wide linking portions equals a number of said narrow linking portions minus one.

5. The wire belt of claim 1 wherein the width of said wide linking portions is approximately equal to a minimum spacing width calculated based on a diameter of said wire link and a pitch of said linking portions, to allow said wide linking portions to be placed into interlocking engagement with said respective wide linking portions in said at least one adjacent wire link.

6. The wire belt of claim 1 wherein the width of said narrow linking portions is dimensioned to receive a sprocket, for driving said wire belt.

7. The wire belt of claim 1 wherein each of said plurality of wire links further comprise a first loop and a second loop at respective said first end and said second end of each of said plurality of wire links, said first loop and said second loop of each of said plurality of wire links being linked with said adjacent wire link.

8. The wire belt of claim 1 further including at least one splice connector linked between two of said plurality links.

9. The wire belt of claim 8 wherein said splice connector includes at least one splice connector portion linked between respective narrow linking portions of said two of said plurality of wire links.

10. The wire belt of claim 1 wherein said plurality of wire links are linked to form an endless belt.

11. The wire belt of claim 1 wherein each of said wide linking portions have substantially the same width, and wherein each of said narrow linking portions have substantially the same width.

12. A wire link for use in a wire belt, said wire link comprising:
    a first end and a second end; and
    a plurality of linking portions between said first end and said second end, for linking with linking portions in adjacent wire links in said wire belt, said plurality of linking portions include alternating wide linking portions and narrow linking portions, wherein said narrow linking portions and wide linking portions alternate from proximate said first end to proximate said second end of said wire link, wherein first and second narrow linking portions are located proximate said first end and said second end respectively of said wire link, each of said wide linking portions having a first width and each of said narrow linking portions having a second width, wherein said first width of said wide linking portions is greater than said second width of said narrow linking portions.

13. The wire link of claim 12 wherein said plurality of linking portions includes an odd number of said plurality of linking portions, and wherein the number of said wide linking portions equals the number of said narrow linking portions minus one.

14. A method of forming a wire belt including a plurality of wire links each having alternating wide linking portions and narrow linking portions, said method comprising:
    selecting a belt width of said wire belt, a diameter of each of said plurality of wire links, and a pitch of said plurality of wire links in said wire belt;
    determining a minimum width of said wide linking portions based upon said diameter of each of said plurality of wire links and said pitch of said plurality of wire links in said wire belt;
    determining a minimum width of said narrow linking portions;
    determining a maximum number of said narrow linking portions and a maximum number of said wide linking portions based upon said narrow linking portion minimum width, said wide linking portion minimum width, and said belt width;
    forming said plurality of wire links having said maximum number of narrow linking portions and said maximum number of wide linking portions alternating along a length of each of said plurality of wire links, wherein first and second narrow linking portions are located proximate said first end and said second end respectively of said wire links; and
    linking said plurality of alternating wide linking portions and narrow linking portions with respective alternating wide linking portions and narrow linking portions in an adjacent wire link to form a wire belt.

15. The method of claim 14 wherein forming said plurality of alternating narrow linking portions and wide linking portions includes forming said plurality of alternating narrow linking portions and wide linking portions from a first end to a second end of each of said plurality of wire links.

16. The method of claim 14 wherein the step of determining said narrow linking portion minimum width includes determining said narrow linking portion minimum width to receive a sprocket for driving said wire belt.

17. The method of claim 14 wherein said maximum number of said narrow linking portions is determined according to the equation:

$$CS(X-2D+MW)/(MW+C)$$

where,
    $X$ = said wire belt width;
    $D$ = an end portion width;
    $MW$ = said wide linking portion minimum width; and
    $C$ = said narrow linking portion minimum width.

18. The method of claim 17 wherein said maximum number of wide linking portions is determined according to the equation $WS=CS-1$.

19. A wire belt conveyor system comprising:
    a plurality of wire links, each of said plurality of wire links being linked with at least one adjacent wire link in a wire belt, each of said plurality of wire links comprising:
        a first end and a second end; and
        a plurality of linking portions between said first end and said second end, said plurality of linking portions being linked with respective linking portions in said at least one adjacent wire link forming a plurality of joints in said wire belt, said plurality of linking portions including alternating wide linking portions and narrow linking portions, wherein said narrow linking portions and wide linking portions alternate from proximate said first end to proximate said second end of each said plurality of wire links, said wide linking portions having a width greater than a width of said narrow linking portions, said narrow linking portions and said wide linking portions being interlocked with respective narrow linking portions and wide linking portions in said at least one adjacent wire link; and a plurality of sprockets engaging said plurality of wire links for driving said wire belt, wherein said plurality of sprockets includes a sprocket engaged with each of said narrow linking portions proximate said first end and said second end of said wire links for driving said wire belt proximate said first end and said second end.

20. The wire belt conveyor system of claim 19 wherein one of said plurality of sprockets is engaged with each of said narrow linking portions.

* * * * *